(No Model.)

C. E. KOKEN.
METHOD OF GILDING GLASS SIGNS AND LABELS.

No. 299,148. Patented May 27, 1884.

Attest:
Albert G. Fish
Wm M Yohe

Inventor:
Charles E. Koken
by C. D. Moody,
atty

UNITED STATES PATENT OFFICE.

CHARLES E. KOKEN, OF ST. LOUIS, MISSOURI.

METHOD OF GILDING GLASS SIGNS AND LABELS.

SPECIFICATION forming part of Letters Patent No. 299,148, dated May 27, 1884.

Application filed March 27, 1883. (No model.)

*To all whom it may concern:*

Be it known that I, CHARLES E. KOKEN, of St. Louis, Missouri, have made a new and useful Improvement in Gilded Glass Signs and Labels, of which the following is a full, clear, and exact description, reference being had to the annexed drawings, making part of this specification, in which—

Figure 1:
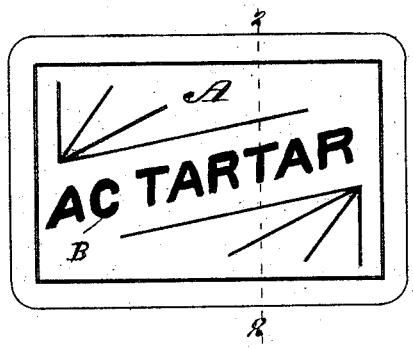
Figure 2:
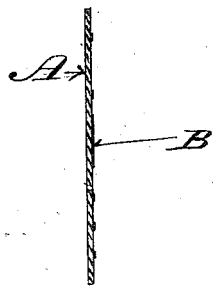

Figure 1 is a front elevation of the improvement, and Fig. 2 a section on the line 2 2 of Fig. 1.

The same letters of reference denote the same parts, A representing the glass, and B the gilding.

The improvement relates to the mode of gilding signs and labels, which I will now proceed to describe and explain.

After cleaning the glass the design or lettering is drawn upon the reverse side of the glass in liquid gold. The solution should be very thin—that is, after the liquid (the menstruum) has been evaporated the gold deposit should be as thin as gold-leaf. In preparing the solution I take chloride of gold combined with a sulphur-rosin composed of sulphur, oil of lavender, and oil of turpentine. After the design has thus been applied, and in this thin form, the glass is subjected gradually to a mild heat—say a temperature of about 800° Fahrenheit—and then gradually cooled, the aim being only to evaporate the menstruum, and not to tarnish the gold, which is the case when a high degree of heat—substantially higher than that above named—is employed, and especially when a thick solution of gold is employed.

The mode of preparing the solution is as follows: First, I take thirty-two parts pure gold and dissolve the same in one hundred and twenty-eight parts each nitric and muriatic acids. While dissolving I add 1.2 parts tin and 1.2 parts antimony-butter. When dissolved, I dilute with five hundred parts water. Then, second, I prepare sulphur-balsam as follows: I take eighty parts turpentine, sixteen parts sulphur, and sixteen parts Venice turpentine, which I heat on sand bath to solution. Then I add fifty parts oil lavender and heat the same until the whole has formed a brown sirupy liquid, which will no longer deposit sulphur on cooling. Then, third, I add the gold solution, and stir with a glass rod until the water and acid are discolored, showing that the gold has been taken up by the sulphur-balsam. Then I pour off the acid and water and wash repeatedly with pure warm water. Then I heat gently to remove moisture. Then I add sixty-five parts oil lavender and one hundred parts oil turpentine. Next I allow impurities to settle and decant clear part, which is concentrated by heat to a fit consistency to work with the brush. The operation must be carefully performed or portions of the gold will be precipitated.

The result of the improved method is not only more readily and economically obtained than by the methods heretofore used, but is also much more brilliant and perfect.

I claim—

The within-described process of gilding glass signs, the same consisting in first cleaning the glass plate, applying the design upon reverse side of the glass with a thin solution composed of chloride of gold, sulphur, oil of lavender, and oil of turpentine, in about the proportions specified, and subjecting the glass to a temperature of about 800° Fahrenheit, and finally gradually cooling the glass, all substantially as described.

CHAS. E. KOKEN.

Witnesses:
C. D. MOODY,
EMET E. KOKEN.